United States Patent [19]

Murphey

[11] 4,414,118

[45] Nov. 8, 1983

[54] METHOD AND COMPOSITIONS FOR DISSOLVING SILICATES IN SUBTERRANEAN FORMATION

[75] Inventor: Joseph R. Murphey, Duncan, Okla.

[73] Assignee: Halliburton Company, Duncan, Okla.

[21] Appl. No.: 316,692

[22] Filed: Oct. 30, 1981

[51] Int. Cl.$^3$ .............................................. E21B 43/27
[52] U.S. Cl. ................................ 252/8.55 C; 166/307
[58] Field of Search .................... 252/8.55 C; 166/307

[56] References Cited

U.S. PATENT DOCUMENTS

| | | | |
|---|---|---|---|
| 1,990,969 | 2/1935 | Wilson | 252/8.55 X |
| 2,118,386 | 5/1938 | Swinehart | 166/307 X |
| 4,056,146 | 11/1977 | Hall | 166/307 X |
| 4,200,154 | 4/1980 | Tate | 252/8.55 |
| 4,304,676 | 12/1981 | Hall | 252/8.55 |

*Primary Examiner*—Herbert B. Guynn
*Attorney, Agent, or Firm*—Robert A. Kent

[57] ABSTRACT

A method and composition to dissolve siliceous material in a subterranean formation. The composition of the invention is an aqueous acidic solution having a pH no greater than 2 and comprised of at least one mineral acid and a fluoride compound of zirconium, chromium or cobalt. The method is carried out by contacting the siliceous material in the subterranean formation with the above identified composition.

18 Claims, No Drawings

METHOD AND COMPOSITIONS FOR DISSOLVING SILICATES IN SUBTERRANEAN FORMATION

This invention relates to the treatment of subterranean earth formations with acid for the purpose of increasing the porosity and permeability of the formations. It further relates to the use of acid solutions containing hydrofluoric acid and a treatment of silica and silicate-containing formations. The invention specifically deals with a composition and method for retarding the reaction rate of hydrofluoric acid on silica and silicates.

A variety of methods have been developed for treating subterranean earth formations for the purpose of stimulating the production of oil, gas, and water therefrom. One such method, which is commonly used, features the injection of an acid composition into the subterranean formation to dissolve materials contained therein to thereby increase the porosity and permeability of the formation.

It is well known that hydrofluoric acid rapidly dissolves silica, clay and mixtures of silica and clay. Thus, hydrofluoric acid has been utilized in the treatment of subterranean formations containing silica and clay to increase the permeability of such formations whereby the ability of fluids, such as oil, gas, and water, to flow through the thus treated formations is enhanced. This practice, known in the relevant art as sandstone acidizing, involves the use of hydrofluoric acid, sometimes in combination with and sometimes in series with other acids, to treat subterranean formations principally comprised of silica and clay.

Thus, in the treatment of sandstone and other formations containing silica and/or silicates, acid treating fluids containing hydrofluoric acid are commonly utilized in that hydrofluoric acid readily dissolves such materials. Silica, also known as silicon dioxide, occurs naturally as sand, quartz, flint, and diatomite. A silicate is a compound containing silicon, oxygen, and one or more metals with or without hydrogen. Clay is a species of silicate commonly found in subterranean earth formations associated with the production of oil, gas, and water. Other silicates include asbestos, talc, feldspar, mica and others. For the purpose of this invention, the term siliceous is used to be silica and/or silicate-containing materials, such as, for example, sandstone.

A problem associated with the use of treating fluids or compositions containing hydrofluoric acid in treating a siliceous formation is that hydrofluoric acid reacts so rapidly with siliceous materials in the formation that it becomes spent before penetrating very deeply into the formation. Consequently, the desired result of increasing the porosity and permeability of the formation is limited to areas closely adjacent the well bore. A method and composition for retarding the reaction rate of hydrofluoric acid on siliceous material is thus required, and is provided by this invention.

The present invention provides an improved acidic composition containing hydrofluoric acid and methods for using the composition to dissolve siliceous materials in subterranean formations. The invention operates to retard the reaction rate of the composition with siliceous materials whereby increased penetration of a treated formation results before the composition becomes spent.

The acidic composition of this invention for dissolving siliceous materials is an aqueous acidic solution having a pH no greater than 2, and comprised of at least 1 mineral acid, and a fluoride compound of zirconium, chromium or cobalt.

It is known that transition metals, such as zirconium, chromium and cobalt, form ligand complexes with anions such as fluorides and water. The ligand complexes are not totally ionized in an aqueous solution. Increasing the anion concentration and reducing the proton concentration in the solution increases the stability of the complex.

As hydrofluoric acid reacts with siliceous material and becomes spent, a hydrolysis reaction in the acid fluid occurs between the water and the transition metal fluoride complexes to replace the spent hydrofluoric acid whereby fluoride ions are released from the complex to replace the spent hydrofluoric acid. Thus, the formation of the ligand complexes retards the formation of hydrofluoric acid by controlling the quantity of hydrofluoric acid available for reaction.

Fluoride compounds that may be utilized in accordance with the present invention are represented by the general formula:

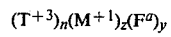

and their hydrates; wherein:

$$3n+z=ay;$$

the cation, T is zirconium, cobalt, or chromium; M is hydrogen (H) or ammonium (NH$_4$) and z is 0 to 4.

Examples of compounds which are particularly suitable for use in accordance with the present invention are chromium fluoride, cobalt fluoride, ammonium zirconium hexafluoride and hydrogen zirconium hexafluoride (H$_2$Zr$_4$F$_6$).

In order to carry out the invention, a transition metal fluoride must be used to form the ligand complex. It is not possible to generate the transition metal fluoride complex using a transition metal halide other than fluoride and a fluoride compound with the exception that silver fluoride can be mixed with a transition metal chloride to form the transitional metal fluoride complex. Due to the high cost of silver compounds, it is not economically feasible to use silver fluoride to carry out the invention.

The amount of fluoride compound present in the composition of the invention will vary greatly, depending upon the formation treated. Aqueous acidic composition which contain as little as 0.05 gram-moles per liter of aqueous acidic composition are effective for retarding the reaction rate of hydrofluoric acid on siliceous materials. With respect to the upper limit of fluoride compounds utilized in the composition of the present invention, there is no real upper limit except as may be dictated by economic considerations. The most preferred fluoride ion concentration is 0.25 gram-moles to about 1.5 gram-moles per liter of aqueous acid composition.

Mineral acids that can be utilized with the fluoride compounds include hydrochloric acid, nitric acid, sulfuric acid, phosphoric acid and mixtures thereof.

The acid composition of this invention can also include at least one organic acid selected from formic acid, acetic acid, citric acid, and mixtures thereof to obtain other properties ordinarily desirable in acid compositions.

Sufficient mineral acid is required in the acid composition of the present invention to produce an acidic composition with a pH value of no greater than 2. A mineral acid concentration of about 0.1 weight percent mineral acid by total weight of acidic composition will provide the requisite pH value. However, it is well known, acid treating operations of subterranean earth formations ordinarily utilize acid compositions having concentrations greater than 0.1 percent. The extent of such concentrations is often limited by field handling problems, safety considerations, and commercial availability. Thus, the actual pH of acidic compositions utilized is ordinarily much less than 2 and the pH is often expressed in negative values. In view of the above comments, it is believed that practical acid concentrations for use herein are in the range from about 0.1 to about 40, preferably from about 5 to about 20 and still more preferably from about 10 to about 15 percent mineral acid by weight of acid composition. It must be stressed, however, that the only real limitation on operability with respect to acidity is the upper pH limit of 2 which can be achieved by an acid concentration of about 0.1 percent acid by weight of composition.

In certain acidic treating operations carried out with an acidic composition, it is preferred that the viscosity of the solution be kept at a minimum in order to facilitate the penetration of acid into the pores of the treated formation. In certain other applications, a composition of higher viscosity may be desired. In those instances, a gelling or thickening agent may be incorporated into the acidic composition. Generally any conventional gelling or thickening agent may be employed in accordance with the present invention. Examples of suitable gelling or thickening agents are galactomannans such as guar gum, xanthan gum, gum karaya, gum tragacanth, gum ghatti, gum acacia, gum konjak, shariz, locus, psyllium, tamarind, gum tara, carrageenin, gum kauri, modified guars such as hydroxypropyl guar, hydroxyethyl guar, carboxymethyl hydroxyethyl guar, carboxymethyl hydroxypropyl guar, cellulose ethers such as carboxyethyl cellulose, carboxymethyl cellulose (CMC), carboxymethyl hydroxyethyl cellulose (CMHEC), hydroxyethyl cellulose, hydroxypropyl cellulose, methylhydroxypropyl cellulose, methyl cellulose, ethyl cellulose, propyl cellulose, and hydroxypropylmethyl cellulose, polyacrylamides, polyacrylates, polysaccharides and alkoxylated amines such as:

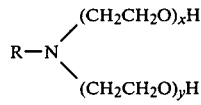

wherein R is selected from saturated and unsaturated aliphatic groups having in the range of from about 8 to 22 carbon atoms and mixtures thereof and the average sum of the value of x and y in the mixture is in the range of about 0 to about 10.

The amount of thickening or gelling agent used in the acidic composition of the invention can vary widely depending upon the viscosity, grade, and purity of the gelling agent and the properties desired in said composition. In general, the amount of thickening or gelling agent used will be in the range of from about 0.1 to about 1 percent weight. There is, however, really no limit on the amount of gelling or thickening agent which can be used as long as the gelled acidic composition can be pumped in accordance with the methods of the invention.

Other materials may be included in the gelled acidic composition of the invention. For instance, proppants including graded sand, river sand, glass beads, sintered bauxite, ceramic beads and walnut shells in the range of from about 0.25 to 15 pounds per gallon of liquid may be used. In addition, various treating agents such as acid corrosion inhibitors, mutual solvents, anti-sludging agents and friction reducing agents may be added to the acid composition of the invention.

When it is more desirable to contact the subterranean with a foam containing the acidic composition of the present invention, any foaming agent compatible with the composition of the invention and capable of producing foam in an acidic environment may be used. Many of these foaming agents are disclosed in U.S. Pat. No. 4,044,833.

The preferred composition of this invention is comprised of water, hydrofluoric acid, hydrochloric acid present in the composition in an amount of about 15% by weight of the acid composition, and 3 grams of chromium fluoride per 100 cc of acidic composition.

In preparing the acidic composition of this invention, the order of mixing the components is not critical. However, an effective technique is to add water to the acids employed in carrying out the invention to form a composition of desired acid concentration. Subsequently, the fluoride compound is added to the acid. Instead of liquid hydrofluoric acid which is difficult to handle, a solid material such as ammonium bifluoride can be utilized to form an aqueous solution of hydrofluoric acid. In this case, it is preferred that to the mineral acid, there be added the fluoride compounds followed by the addition of water to form an acidic composition of desired strength.

Once formed, the compositions of the present invention have long shelf lives, i.e., very little undesirable precipitates are formed while the compositions are stored, the compositions are easily prepared and the compositions can be pumped into a subterranean formation to be treated in a single stage, i.e., the compositions do not require the introduction of other fluids into the formation prior to or after the introduction of the compositions. The reaction rates of the compositions with siliceous materials are retarded by a factor of 2 or 3 times as compared to prior acid compositions containing hydrofluoric acid and, therefore, can achieve much deeper penetration into a formation being treated before becoming spent as compared to prior compositions.

In using a composition of this invention for stimulating the production of desired fluids from subterranean formations, the composition is prepared either at the time the treatment is to be carried out or prior to such time. When the treatment is carried out, the composition is simply pumped into the formation to be treated using conventional methods and equipment and as the composition contacts the formation, siliceous and other materials contained in the formation are dissolved. After the composition becomes spent, it is recovered from the formation resulting in an increase in the porosity and permeability of the formation adjacent the well bore as well as in areas away from the well bore. The increase in the porosity and permeability of the formation increases the productivity of desired fluids therefrom.

In sandstone formations, clays are the most damaging from the standpoint of preventing the production of desired fluids therefrom. However, since the compositions of the present invention are retarded, they dissolve more of the clays and less of the sand and other nondamaging materials in the formation thereby achieving superior results as compared to heretofore used non-retarded acid compositions.

The acid composition of this invention can be utilized in various ways for treating subterranean formations for the purpose of dissolving siliceous materials. In one method, the composition can be placed in contact with the desired formation by merely introducing it into the well bore and permitting it to traverse the bore until it contacts the formation. The composition is thereafter permitted to remain in contact until it spends and then it can be recovered.

According to another method of use, the acid composition of this invention can be preceded by a preflush fluid and followed by an overflush fluid wherein each of the preflush fluid and the overflush fluid and the acid composition of this invention can contain additives ordinarily employed in acid treating compositions, such as for example nonemulsifying agents, corrosion inhibitors, clay stabilizers, surface tension reducing agents, and the like.

In one typical treatment, the subterranean formation is first contacted with a preflush fluid, such as 5 to 15% hydrochloric acid. This acid preflush can also include an organic acid, such as formic and acetic acid. The preflush fluid can be followed by a conventional mud acid, which ordinarily comprises 3% hydrofluoric acid and 12% hydrochloric acid, which is then followed by the acid composition of this invention. Following this, an overflush fluid can be used. An overflush can include any one or all of the following: hydrochloric acid, ammonium chloride, diesel oil, kerosene, lease crude, nitrogen gas or carbon dioxide.

The following examples will serve to more comprehensively illustrate the principals of the invention but in being directed to certain specific compounds and process steps and conditions, not intended to limit the bounds of the invention.

EXAMPLE I

Acid compositions of this invention were prepared containing various quantities of hydrochloric and chromium fluoride. In addition, acid compositions were prepared containing hydrochloric acid and hydrofluoric acid but no $CrF_3$. 9 percent $CrF_3 \cdot 3\frac{1}{2}H_2O$ has the same number of moles of fluoride as 3 percent HF and $4\frac{1}{2}$ percent by weight of $CrF_3 \cdot 3\frac{1}{2}H_2O$ has the same number of moles of fluoride as $1\frac{1}{2}$ percent HF. 25 cc samples of both acid compositions were reacted with 3 grams of silica flour for 1 hour and 24 hours at a reaction temperature of 150° F. The results of these tests are shown in Table I below.

TABLE I

EFFECT OF CHROMIUM FLUORIDE ON THE DISSOLUTION OF SILICA FLOUR

| Test Number | % by Weight Hydrofluoric Acid in Composition | % by Weight of Hydrochloric Acid in Composition | % by Weight of $CrF_3 \cdot 3\frac{1}{2} H_2O$ in Composition | Silica Flour Dissolved ppm | |
|---|---|---|---|---|---|
| | | | | 1 Hour | 24 Hours |
| 1 | 3 | 5 | — | 12,000 | — |
| 2 | — | 5 | 9 | 3,960 | 7,465 |
| 3 | — | 10 | 9 | 5,960 | 8,110 |
| 4 | — | 15 | 9 | 6,665 | 9,510 |
| 5 | 1½ | 5 | — | 4,180 | — |
| 6 | — | 5 | 4½ | 1,560 | 4,060 |
| 7 | — | 10 | 4½ | 2,280 | 5,200 |
| 8 | — | 15 | 4½ | 2,805 | 6,840 |

From Table I, it can be seen that the acid compositions of the present invention effectively retard the reaction of the acid on silica flour.

EXAMPLE II

A composition of the present invention was prepared containing 5 percent by weight hydrochloric acid and 6 percent by weight $(NH_4)_2ZrF_6$. 25 cc samples of the acid composition was reacted with 3 grams of bentonite clay at 150° for 12 hours. The acid composition of the invention reacted with 67.5 percent of the bentonite clay in 5 minutes, 87.6 percent of the bentonite clay in 1 hour, and 100 percent of the bentonite clay in 6 hours. Generally, hydrofluoric acid reacts completely on clay within 5 minutes at the same conditions.

EXAMPLE III

An acid composition of the present invention containing 15 percent by weight hydrochloric acid and 8.9 grams per 100 cc of cobalt fluoride was prepared. A 25 cc sample was reacted with 3 grams of silica flour for a period of 24 hours. After one hour, the composition of the invention dissolved 9,890 ppm of silica flour and after 24 hours dissolved 14,700 ppm of silica flour. A solution of 12 percent by weight of hydrochloric acid and 3 percent by weight of hydrofluoric acid was also reacted with silica flour for a period of 24 hours. This composition dissolved 11,400 ppm of silica flour after 24 hours. The cobalt fluoride was effective in retarding the rate of reaction of the acid on the silica flour.

Although certain preferred embodiments of the invention have been herein described for illustrative purposes, it will be appreciated that various modifications and innovations of the procedures and compositions recited may be affected without departure from the basic principals which underlie the invention. Changes of this type are therefore deemed to lie within the spirit and scope of the invention except as being necessarily limited by the amended claims or reasonable equivalents thereof.

I claim:

1. A retarded aqueous acid composition for dissolving siliceous materials comprising:
   (a) a mineral acid other than hydrofluoric acid;
   (b) a compound having the formula $$(T^{+3})_n(M^{+1})_z(F^{-a})_y$$

the hydrates of said compound and mixtures thereof wherein T is selected from the group consisting of cations of zirconium, chromium, and mixtures thereof;

M is selected from the group consisting of hydrogen and ammonium;

z is 0 to 4; and $$3n+z=ay$$

wherein said aqueous acid composition has a pH value no greater than 2 and the fluoride ion of said compound is present in said composition in an amount of at least 0.05 gram-moles of fluoride ion per liter of composition.

2. The composition recited in claim 1 wherein said mineral acid is selected from the group consisting of hydrochoric acid, nitric acid, sulfuric acid, phosphoric acid and mixtures thereof.

3. The composition recited in claim 1 wherein said compound is selected from the group consisting of chromium fluoride, zirconium ammonium hexafluoride and hydrogen zirconium hexafluoride.

4. The composition recited in claim 2 wherein said mineral acid is present in an amount in the range of from about 0.1 to about 40 percent by weight of said composition.

5. The composition recited in claim 1 wherein said aqueous acid composition further comprises a gelling agent.

6. The composition recited in claim 5 wherein said gelling agent is selected from the group consisting of galactomannans, modified guars, modified celluloses, polyacrylamides, polyacrylates and alkoxylated amines.

7. The composition recited in claims 5 or 6 further comprising a propping agent.

8. The composition recited in claim 1 wherein said fluoride ion is present in said composition in a range of from about 0.25 gram-moles per liter of composition to about 1.5 gram-mole per liter of composition.

9. The composition recited in claim 1 wherein said compound is chromium fluoride.

10. A method of acidizing a siliceous subterranean formation comprising:

contacting said formation with a retarded aqueous acid composition comprising:

(a) a mineral acid other than hydrofluoric acid;

(b) a compound having the formuls $$(T^{+3})_n(M^{+1})_z(F^{-a})_y$$

the hydrates of said compound and mixtures thereof wherein T is selected from the group consisting of cations of zirconium, chrominum and mixtures thereof;

M is selected from the group consisting of hydrogen and ammonium;

z is 0 to 4; and $$3N+z=ay$$

wherein said aqueous acid composition has a pH value no greater than 2 and the fluoride ion of said compound is present in said composition in an amount of at least 0.05 gram-moles of fluoride ion per liter of composition.

11. The method recited in claim 10 wherein said mineral acid is selected from the group consisting of hydrochloric acid, nitric acid, sulfuric acid, phosphoric acid and mixtures thereof.

12. The method recited in claim 10 wherein said compound is selected from the group consisting of chromium fluoride, zirconium ammonium hexafluoride and hydrogen ammonium hexafluoride.

13. The method recited in claim 10 wherein said aqueous acid composition further comprises a gelling agent.

14. The method recited in claim 13 wherein said gelling agent is selected from the group consisting of galactomannans, modified guars, modified celluloses, polyacrylamides, polyacrylates and alkoxylated amines.

15. The method recited in claim 10 wherein said mineral acid is present in an amount in the range of from about 0.1 to about 40 percent by weight of said composition.

16. The method recited in claims 13 or 14 wherein said aqueous acid composition further comprises a propping agent.

17. The method recited in claims 10 or 13 wherein said compound is chromium fluoride.

18. The method recited in claim 10 wherein said fluoride ion is present in said composition in a range of from about 0.25 gram-moles per liter composition to about 1.5 gram-moles per liter of composition.

* * * * *

UNITED STATES PATENT AND TRADEMARK OFFICE
CERTIFICATE OF CORRECTION

PATENT NO. : 4,414,118

DATED : November 8, 1983

INVENTOR(S) : Joseph R. Murphey

It is certified that error appears in the above-identified patent and that said Letters Patent is hereby corrected as shown below:

Title page, line 4, should read --Inventors: Bobby E. Hall and Joseph R. Murphey-- instead of [Inventor: Joseph R. Murphey].

Col. 6, ln. 59 reads "I claim", it should read -- What is claimed is:--.

Col. 8, ln. 1 the word "formuls" should read --formula--.

Signed and Sealed this

Third Day of April 1984

[SEAL]

Attest:

GERALD J. MOSSINGHOFF

*Attesting Officer*     *Commissioner of Patents and Trademarks*